(12) United States Patent
Horton et al.

(10) Patent No.: US 9,063,757 B2
(45) Date of Patent: Jun. 23, 2015

(54) INTERACTIVE APPLICATION ASSISTANCE, SUCH AS FOR WEB APPLICATIONS

(75) Inventors: Anson M. Horton, Kirkland, WA (US); Douglas J. Amaral, Redmond, WA (US); Daniel R. Thorpe, Ben Lomond, CA (US); Moneta K. Ho Kushner, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 597 days.

(21) Appl. No.: 12/754,625

(22) Filed: Apr. 6, 2010

(65) Prior Publication Data

US 2011/0246880 A1 Oct. 6, 2011

(51) Int. Cl.
| | |
|---|---|
| *G06F 3/00* | (2006.01) |
| *G06F 9/44* | (2006.01) |
| *G06F 3/0481* | (2013.01) |
| *G06F 3/0482* | (2013.01) |
| *G06F 3/01* | (2006.01) |
| *G06F 3/0484* | (2013.01) |

(52) U.S. Cl.
CPC ............ *G06F 9/4446* (2013.01); *G06F 3/0481* (2013.01); *G06F 3/0482* (2013.01); *G06F 3/0484* (2013.01)

(58) Field of Classification Search
CPC .... G06F 9/4446; G06F 11/30; G06F 3/04895
USPC ......... 715/705, 706, 707, 708, 709, 710, 711, 715/712, 713, 714, 715
See application file for complete search history.

(56) References Cited

U.S. PATENT DOCUMENTS

| | | | | |
|---|---|---|---|---|
| 5,442,759 | A | * | 8/1995 | Chiang et al. .................. 705/326 |
| 5,483,632 | A | | 1/1996 | Kuwamoto et al. |
| 5,890,905 | A | * | 4/1999 | Bergman ....................... 434/118 |
| 6,300,950 | B1 | | 10/2001 | Clark et al. |
| 6,542,163 | B2 | * | 4/2003 | Gorbet et al. .................. 715/711 |
| 6,845,486 | B2 | * | 1/2005 | Yamada et al. ................ 715/706 |
| 6,904,565 | B1 | * | 6/2005 | Lentz ............................. 715/705 |
| 7,047,498 | B2 | | 5/2006 | Lui et al. |
| 7,152,054 | B2 | | 12/2006 | Gordon et al. |
| 7,346,846 | B2 | | 3/2008 | Rossi, Jr. et al. |

(Continued)

OTHER PUBLICATIONS

Quesenbery, Whitney, "On Beyond Help: User Assistance and the User Interface", Retrieved at <<<<http://www.wqusability.com/articles/on-beyond-help.html>> STC Journal, Technical Communication, vol. 48, No. 2, May 2001, p. 10.

*Primary Examiner* — Nicholas Augustine
(74) *Attorney, Agent, or Firm* — Jim Banowsky; Kate Drakos; Micky Minhas (57) ABSTRACT

An application assistance system is described herein that provides an on-demand canonical user interface that can quickly allow a user to learn the actions exposed by an application, such as a web site. The application assistance system is a pattern and method for guiding the user of a site/application through a set of possible actions on a page by providing a well-known invocation of hints. These hints show the actions/tasks that a user can take on a page by visually spotlighting a specific area of the page and providing a tooltip or pop-up dialog that describes the action/task the user is trying to complete while preserving the data the user has already entered. The system also provides a task pane that supports randomly accessing various steps of a task the system is explaining. Thus, the system makes it much easier for a user to learn to use an application.

18 Claims, 4 Drawing Sheets

(56) References Cited

U.S. PATENT DOCUMENTS

| | | |
|---|---|---|
| 7,587,668 B2 | 9/2009 | Bala |
| 8,151,192 B2 * | 4/2012 | Black et al. .................. 715/708 |
| 8,271,876 B2 * | 9/2012 | Brugler et al. ............... 715/708 |
| 2003/0058267 A1 * | 3/2003 | Warren ......................... 345/705 |
| 2006/0184880 A1 | 8/2006 | Bala |
| 2008/0195946 A1 * | 8/2008 | Peri-Glass ................... 715/715 |
| 2009/0006956 A1 * | 1/2009 | Bae et al. ..................... 715/708 |
| 2009/0288005 A1 * | 11/2009 | Stapleton et al. ............. 715/711 |
| 2010/0192097 A1 * | 7/2010 | Brugler et al. ............... 715/821 |

* cited by examiner

INTERACTIVE APPLICATION ASSISTANCE, SUCH AS FOR WEB APPLICATIONS

BACKGROUND

The Internet is filled with many different types of content, such as text, video, audio, and so forth. Many sources produce content, such as traditional media outlets (e.g., news sites), individual bloggers, retail stores, manufacturers of products, and so forth. Some web sites aggregate information from other sites. For example, using a Really Simple Syndication (RSS) feed, a web site author can make content available for other sites or users to consume, and an aggregating site can consume various RSS feeds to provide aggregated content.

Web applications/sites grow richer every day, both in terms of functionality and the complexity of user interface (UI) used to expose that functionality. In the early days of the web, most web pages were simply subtle variants of each other, providing primarily textual information formatted in various ways. Over time, the web has grown to allow arbitrarily complicated applications with code and data residing on multiple tiers, and with virtually every site having some custom UI metaphor for accessing its features. Unlike desktop applications, there are few common controls in regular use for the web and the amazing flexibility of the platform has lead to high variation in implementation. This means that each site/application may involve a user learning a completely different interface from other sites in order to accomplish a task. Different sites have varying degrees of success in exposing their feature set. Users navigating to any arbitrary site need a way to learn more quickly actions they can take and, as such, be more productive.

There have been various previous attempts to solve this problem with limited success. For the web, the majority of these solutions focus on textual documentation, video walkthroughs, and occasionally interactive reference documentation. All of these approaches have undesirable limitations. Textual documentation often loses the context of the elements and actions it is trying to explain because the documentation is removed from the site itself. Notably, it is common to include screenshots of the site in the documentation in order to try to build that context again. Thus, there is a disconnect between what the user is doing on the live site and the documentation the user is reading in another window. Video suffers from similar problems, though benefits from being more visual. However, video suffers from the additional problem that it is generally more complicated to access very specific information (e.g., random access in videos is poor).

Interactive reference documentation can be very successful and is often exposed as a help icon that explains a particular element of the site. For example, a site may request a credit card security code in a textbox. Many people do not know what a security code is so the site will often have an icon that the user can hover a cursor over to show a description of where to find that information. This preserves the context of the user's scenario, and can be a very successful way to communicate this information. However, this method has traditionally been limited to reference documentation about specific elements on a page and has not been used to explain either conceptual topics or to enumerate the actions associated with a page or site. An additional problem with this technique is that, with a complex page, the help icons proliferate to the point of distraction and generally clutter an otherwise clean UI design.

SUMMARY

An application assistance system is described herein that provides an on-demand canonical user interface that can quickly allow a user to learn the actions exposed by an application, such as a web site. The application assistance system is a pattern and method for guiding the user of a site/application through a set of possible actions on a page by providing a well-known invocation of hints. These hints, when activated, show the actions/tasks that a user can take on a page by visually spotlighting a specific area of the page and providing a tooltip or pop-up dialog that describes the action/task the user is trying to complete while preserving the data the user has already entered. Further, the system may include a guided tour that exposes a task pane that supports non-linearly accessing various steps of a task the system is explaining. Thus, the application assistance system makes it much easier for a user to learn to use a web site or other application that employs the system, thereby making the user more productive using the application in less time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An application assistance system is described herein that provides an on-demand canonical UI that can quickly allow a user to learn the actions exposed by an application, such as a web site. The application assistance system is a pattern and method for guiding the user of a site/application through a set of possible actions on a page by providing a well-known invocation of hints. These hints, when activated, show the actions/tasks that a user can take on a page by visually spotlighting a specific area of the page (e.g., fading out the rest of the page) and providing a tooltip or pop-up dialog that describes the action/task the user is trying to complete while preserving the data the user has already entered (i.e., keeping their context intact). Further, the system may include a guided tour that exposes a task pane that supports non-linearly accessing various steps of a task the system is explaining. In some embodiments, the system provides a generic system for exposing interactive walkthrough help or steps in a way that allows the user to see those steps with data the user has already entered, and from the point in the process the user has attained (as opposed to starting from the beginning again).

The system may include a spotlight effect for communicating specific elements that a user can interact with on a page. For example, if the page is defined using Hypertext Markup Language (HTML), then the system may identify DIV tags that delineate regions of the page and fade those regions other than a currently applicable region. The system may also provide task pane based navigation specifically through the task that the user is trying to accomplish. In addition, the system provides an ability to overlay multiple, user-interactive hint information hot spots on top of a target web page without requiring insertion of visual elements for each element of interest on the target web page (e.g., to avoid cluttering the display with help icons). Thus, the application assistance system makes it much easier for a user to learn to use a web site or other application that employs the system, thereby making the user more productive using the application in less time.

In some embodiments, the application assistance system provides help to users who are either trying to perform a task on a site they have not performed before (or have simply forgotten how to do) or to help them understand the actions that they can perform on any particular page of that site. The user can invoke the system in two different ways. First, the user can invoke the system through a task pane. A task pane may include a vertical region (e.g., an HTML DIV) on one side of the page that contains content. In this case, the content is a guided tour through the various tasks that the authors of the site determined would be common. Second, the user can invoke the system in such a way as to provide contextual targets (e.g., through hovering or other indication) for the actions that a user can perform on a page. Hovering may include holding the pointing device cursor (which may include mouse, proximal pen, or proximal touch devices) relatively immobile for a brief period without clicking in a particular area. A contextual target can be any sort of visual marker that can activated to invoke the system for a page region or other context.

In some embodiments, the guided tour of the application assistance system works in the following way. First, the user activates a task pane on the site, such as by clicking a tour icon. The task pane contains descriptions for the various tasks that are applicable to the page that the user is on currently. If the user navigates to a different page, the system may update the task pane to reflect tasks applicable to the new page. The tasks can take the form of a bulleted list of steps to take to accomplish the task, or as a textual description with links that support highlighting a particular step. For example, for a site that includes a login page, the task pane may contain tasks for creating a new account, logging into an existing account, and cancelling an account. These steps associated with the login task can take the form of a list such as: 1) click on an ID to sign in, 2) type the password for the selected ID, and 3) click the sign-in button. Alternatively or additionally, the login task may include descriptive text, such as "to get started with this web site you need to log in with a specific user name . . . in order to log-in, select an existing ID, enter a password, and then click the sign-in button." In either case, if the user selects a step in the task (or hovered over) the system updates the page with a spotlight or other focusing effect that highlights the particular area of the page in which the action can be performed. For example, if the user selects a "click on ID to sign in" step, then only the IDs on the page would be highlighted and the rest of the page would fade into the background.

These steps may be accessed in a non-linear way, unlike video and other previous assistance techniques. For example, suppose that the task being modeled is "creating a conversation with a client." A step (or sub-task) may be to attach a document to the conversation the user wants to create. The user highlights that particular step or link in the task pane and the system continues providing assistance from that point. In addition, the guided tour mode supports synchronization of steps with the user's workflow. In the previous example, the user explicitly clicked on the "attach a document" sub-task of the "creating a conversation with a client" task. However, the user may also simply activate the top-level task and the system synchronizes the steps based on what has already been accomplished. In this case, if the user has a thread active, a new message created, and they select this task, then the system synchronizes to the "attach a document" step.

In some embodiments, the application assistance system can be invoked by hovering over a help target specified by the application developer. The author places a link or other indication into either the page or the task pane that enabled hover targets. Hover targets appear on the page with an icon indicating that a particular location is a valid target. When the user activates a hover target (e.g., by hovering over it), a tool-tip or other help display appears that contains any type of information (e.g., text, images, videos) provided by the author to describe an activity that the hover target demarks.

In some embodiments, the application assistance system uses HTML page markup to structure UI elements on a browser page; CSS to position, style, and select UI elements on the page; client-side JavaScript programming logic to manipulate the elements of the page; and query logic (e.g., JQuery) to select, process, or apply changes to groups of UI elements having similar attributes. The HTML page may contain one or more "items of interest"—elements that are the objects of guided tour steps or help topic text. The system assigns each item of interest, or help target, a distinguishable class name in the item's HTML CLASS property.

Each topic in the guided tour task pane is associated with a CSS selector that uniquely identifies the HTML element that the topic describes. As the guided tour advances to a new topic (by user click or by auto advance), the system spotlights an HTML element matching the CSS selector by inserting partially opaque "shade" DIV elements over the rest of the HTML page, leaving only the element matching the CSS selector displayed with normal brightness and visibility. Since HTML elements are currently rectangular, four shade DIV regions are typically sufficient to obscure everything above, below, left and right of the target element. The shade DIV elements may also block mouse clicks from reaching the obscured HTML controls by capturing any input and declining to pass the input on to the underlying controls. The CSS selectors may simply select the help target element by its class name, or may use a combination of CSS selector logic to select the help target element by its containment path, siblings, attributes, or other distinguishing information. This helps minimize the changes to the HTML page to use the generic assist mode technique with that page.

HTML layout may expand some UI elements to fill the remaining page width or page height. In such cases, it may be helpful to insert intermediate parent DIV elements around the help target element(s) to constrain the size of the help target elements and reduce the size of the spotlight effect to just the information of interest, without vast expanses of blank space. The author or system can configure the intermediate parent DIV regions so as not to affect the visual display of the content, while providing additional document structure for the generic assist mode logic to attach to and manipulate.

In some embodiments, when multiple HTML elements are the target of a help topic, the system designates a common parent container as the help target. In some cases, the system may insert an intermediate parent DIV around the selected elements to isolate them from other nearby elements for spotlighting.

In some embodiments, the "hover target" assist mode is a modal state that overlays the HTML page instead of operating in a sidebar as the guided tour assist mode does. For example, the user may click on a link on the HTML page to turn on assist mode, and then the hover target assist mode overlays clickable icons near all the help targets on the current page. The icons are above the HTML elements of the page so that they do not disrupt the layout of the page. For example, the system may position the icons relative to their associated help target element using CSS relative positioning. The system can also allow help icon positions to be auto calculated or overridden with explicit position attributes.

While the system is displaying the help icons, the user can use other HTML elements of the page as normal. When the pointing device (mouse or proximal touch device) cursor hovers over a help icon, the associated help target element is spotlighted and the system displays help text for the help target in a pop-up balloon or other interface to one side of the help target. The system removes the balloon help text and shading after the user clicks on the balloon help text or moves the cursor off the balloon. Hover target assist mode ends after the user clicks on a close icon to return to normal operation of the web page.

Figure 1:
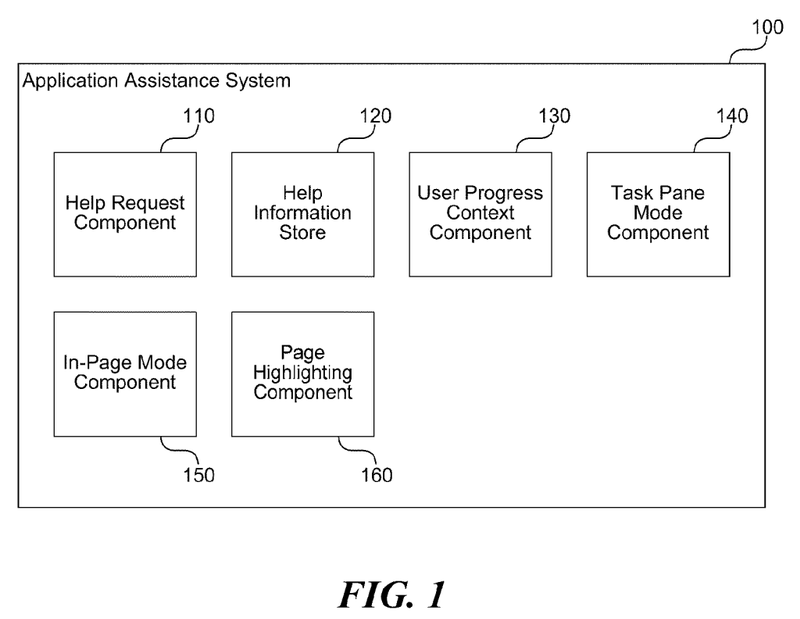
FIG. 1 is a block diagram that illustrates components of the application assistance system, in one embodiment.

FIG. 1 is a block diagram that illustrates components of the application assistance system, in one embodiment. The system 100 includes a help request component 110, a help information store 120, a user progress context component 130, a task pane mode component 140, an in-page mode component 150, and a page highlighting component 160. Each of these components is described in further detail herein.

The help request component 110 detects user requests to activate application assistance to receive help performing one or more tasks related to a software application. For example, a web page using the application assistance system 100 may include an icon or link that the user can select to activate application assistance. The help request component 110 receives the request and turns on application assistance, such as by displaying the task pane described herein or displaying in-page contextual assistance information. The help request component 110 may also handle requests to turn off application assistance and remove any UI related to application assistance from the page or other application display.

The help information store 120 is a data store that stores assistance information for display to the user during application assistance. The data store may include hierarchical or other relationship information between assistance information to indicate relationships such as a sequential list of steps, a subtask of a larger task, and so forth. The data store may include one or more hard drives, file systems, databases, cloud-based storage services, storage area networks (SANs), or any other technique for persisting data that can be accessed by the system 100 to respond to user requests for assistance.

The user progress context component 130 detects user progress within an identified application task and provides context information to other components of the system. Other components may use the progress context to start providing assistance at a point within the identified task where the user is stuck. The progress context also allows the system 100 to display the user's own data within help information. For example, if the user has uploaded a picture and then wants to tag the picture, the system 100 may display the user's own uploaded picture within help information on a topic such as labeling the picture. The user progress context component 130 may receive updates to the user's progress as the user takes additional actions within a web page or other application UI, and provide the updated context information to other components of the system to update the context of assistance those components provide (e.g., to automatically move to the next step in a list of steps for performing a task).

The task pane mode component 140 provides application assistance to the user through a task pane user interface displayed outside of an application page for which the user has requested assistance. For example, the component 140 may display a task pane adjacent (e.g., to the left or right) of the application page so that the user can see in the same place both the assistance information and the application page where the user will use the assistance information to perform the task. The task pane may also include a detached window that the user can move around to the most helpful location for the user or dock to various areas of the screen or application window so that the user can have application assistance information wherever the user prefers.

The in-page mode component 150 provides application assistance to the user through assistance information displayed within the application page for which the user has requested assistance. For example, the component 150 may display a pop-up window, balloon text, tooltips, or inline help text within an application page. The component 150 displays the assistance information neighboring a particular page element to provide the user with localized assistance in close proximity to an area of the page where the user wants assistance. The in-page mode component 150 may be activated by hovering, clicking on a help icon or other element, or other user input that indicates that the user is having trouble and wants assistance with a particular area of the page. The component 150 may also include a toggle control that allows the user to turn in-page assistance on or off. If in-page assistance is off, then an application may display a cleaner UI without assistance indicators, and if in-page assistance is on the application may display help icons and other indicators next to elements for which the system 100 can provide assistance.

The page highlighting component 160 focuses user attention on one or more regions of an application page to help direct the user to a next step location of a task. For example, upon receiving a request for assistance with the task, the component 160 may fade areas of the page not related to performing the task or a current step of the task. Alternatively or additionally, the component 150 may use other common UI techniques to draw the user's attention, such as flashing or highlighting a focal region of the page, outlining the focal region in bold, zooming or enlarging the focal content, and so forth. The page highlighting component 160 may receive updated information on the user's progress through the task from the user progress context component 130 and may update the region or regions that are highlighted to draw the user's attention to a subsequent step of the task.

The computing device on which the application assistance system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
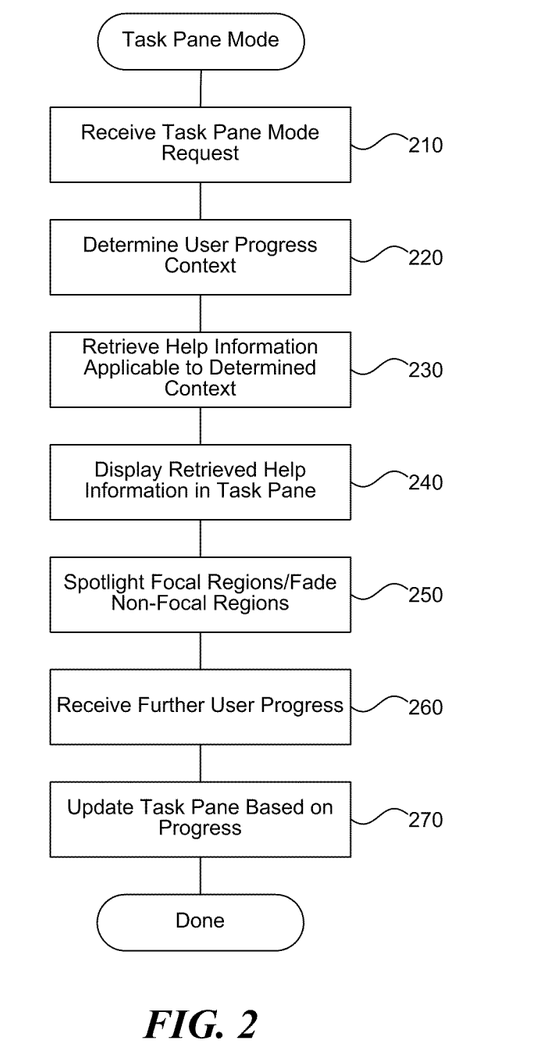
FIG. 2 is a flow diagram that illustrates processing of the application assistance system to display assistance in a task pane mode, in one embodiment.

FIG. 2 is a flow diagram that illustrates processing of the application assistance system to display assistance in a task pane mode, in one embodiment. Beginning in block 210, the system receives a request to display assistance information in a task pane related to a task that a user can perform through an application page. For example, a user of a web page or other application page may select a link to activate a task pane assistance mode. Continuing in block 220, the system determines a user progress context that includes an indication of any steps of the task that the user has already completed and any data related to the task that the user has entered. For example, if the user has typed information to create an appointment, then the system may identify the typed information. If the user has performed two steps of a five-step process, then the system may identify the first two completed steps.

Continuing in block 230, the system retrieves from a help information data store help information applicable to the determined user progress context. For example, if the user progress context indicates that the user has completed two steps of a five-step task, then the system may display help information about the third (next) step of the task. Similarly, if the user has entered text related to the task, then the system may integrate the user-entered text in an appropriate place within help text so that the user receives assistance information with the user's own data displayed to give the user further comfort and context within the process. Continuing in block 240, the system displays the task pane near the application page, wherein the task pane includes at least part of the retrieved help information related to the determined user progress context. For example, the system may display the task pane to the left of the application page, and may resize the application page so that the task pane and application page can fit within an existing application window (e.g., a web browser window). The system may also update scrolling or other application page positioning information so that a region of the application page related to the user's current task is visible and/or centered even after any resizing.

Continuing in block 250, the system spotlights one or more regions of the application page related to the determined user progress context and retrieved help information to increase user focus on the regions. For example, the system may insert HTML DIV tags around regions of the page that are not relevant to the current task, and increase opacity or other display settings of the non-relevant regions to cause them to appear faded to the user, and to cause non-faded regions to appear more relevant to the user. The system may also flash a region identified (e.g., by an HTML class and matching class associated with a help topic) as relevant to the current help information.

Continuing in block 260, the system determines an updated user progress context based on one or more actions taken by the user in response to the displayed help information. For example, if the user clicked a button, and clicking the button was the next step of the current task, then the system determines the next step of the task. Continuing in block 270, the system updates the task pane to display help information related to the updated user progress context. For example, the system may collapse a previous help topic displayed in a tree view and expand the next help topic that describes the next step in a sequential task. The system may also update the highlighted regions of the application page (not shown) to fade previously highlighted regions and highlight regions related to the current step of the task. If the task contains no more steps, then the system may display a congratulatory message or message that indicates that the user completed the task. The system may also display other tasks that the user can perform next. After block 270, these steps conclude.

Figure 3:
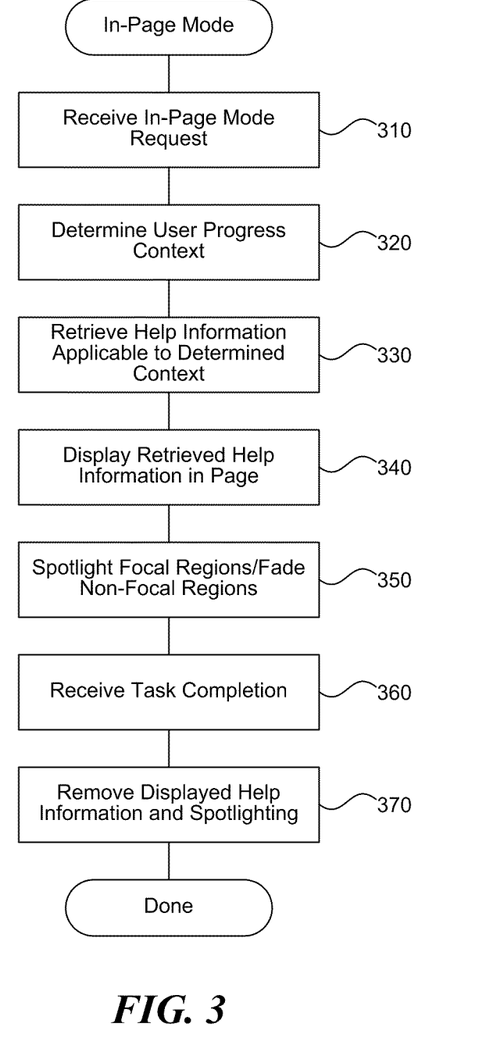
FIG. 3 is a flow diagram that illustrates processing of the application assistance system to display assistance in an in-page mode, in one embodiment.

FIG. 3 is a flow diagram that illustrates processing of the application assistance system to display assistance in an in-page mode, in one embodiment. Beginning in block 310, the system receives a request to display assistance information in an in-page user interface related to a task that a user can perform through an application page. For example, a user of a web page or other application page may hover over a control to activate an in-page assistance mode for a particular control. Continuing in block 320, the system determines a user progress context that indicates a location within the page where a user is working. The context may also indicate any steps of the task that the user has already completed and any data related to the task that the user has entered. For example, if a user is hovering over a login ID text box, then the system may identify the login ID box as the subject of the assistance request. If the login process includes multiple steps, then the system may identify the steps that the user has completed and/or a next step to be completed.

Continuing in block 330, the system retrieves from a help information data store help information applicable to the determined user progress context. For example, if the user progress context indicates that the user has completed two steps of a five-step task, then the system may display help information about the third (next) step of the task. Similarly, is hovering over a particular control, then the system may retrieve assistance information about that control.

Continuing in block 340, the system displays the retrieved help information in a user interface within the application page. For example, the system may display a pop-up, balloon, tooltip, dialog box, or other user interface control that displays information to the user. The displayed information may include any type of content, such as text, hypertext (e.g., with links to further information), audiovisual content (e.g., an instructional video related to the present control), and so forth. Because of the focused context provided by the system, the system can provide smaller chunks of targeted information to help the user complete the present portion of the task. This differs from, for example, a long instructional video that sequentially explains several steps and is not conducive to random access. In some cases, the system may dynamically create instructional videos from base information plus the user's data to guide the user through a small step using the user's own data. The system may display the user interface over the application page, to the side of the applicable page element, or another location that provides the user with contextual assistance.

Continuing in block 350, the system spotlights one or more regions of the application page related to the determined user progress context and retrieved help information to increase user focus on the regions. For example, the system may insert HTML DIV tags around regions of the page that are not relevant to the current task, and increase opacity or other display settings of the non-relevant regions to cause them to appear faded to the user, and to cause non-faded regions to appear more relevant to the user. The system may also flash a region identified (e.g., by an HTML class and matching class associated with a help topic) as relevant to the current help information.

Continuing in block 360, the system receives an indication that the user has finished with a current milestone of the task the user was performing. For example, the system may determine that the user has typed text in a text box and tabbed or clicked in a new region of the application page. As another example, the user may click a "next" link within the help information user interface that indicates that the user is ready to move to the next step of the task. Continuing in block 370, the system removes the displayed help information and spotlighting after the current milestone is complete. For example, if the system popped up a help dialog for a text box and the user moves a cursor to a different control, then the system removes the dialog. If the system faded other areas of the screen to put spotlight the text box, then the system removes the fading. The system may subsequently display help information related to the newly selected control, repeating the above steps again. After block 370, these steps conclude.

Figure 4:
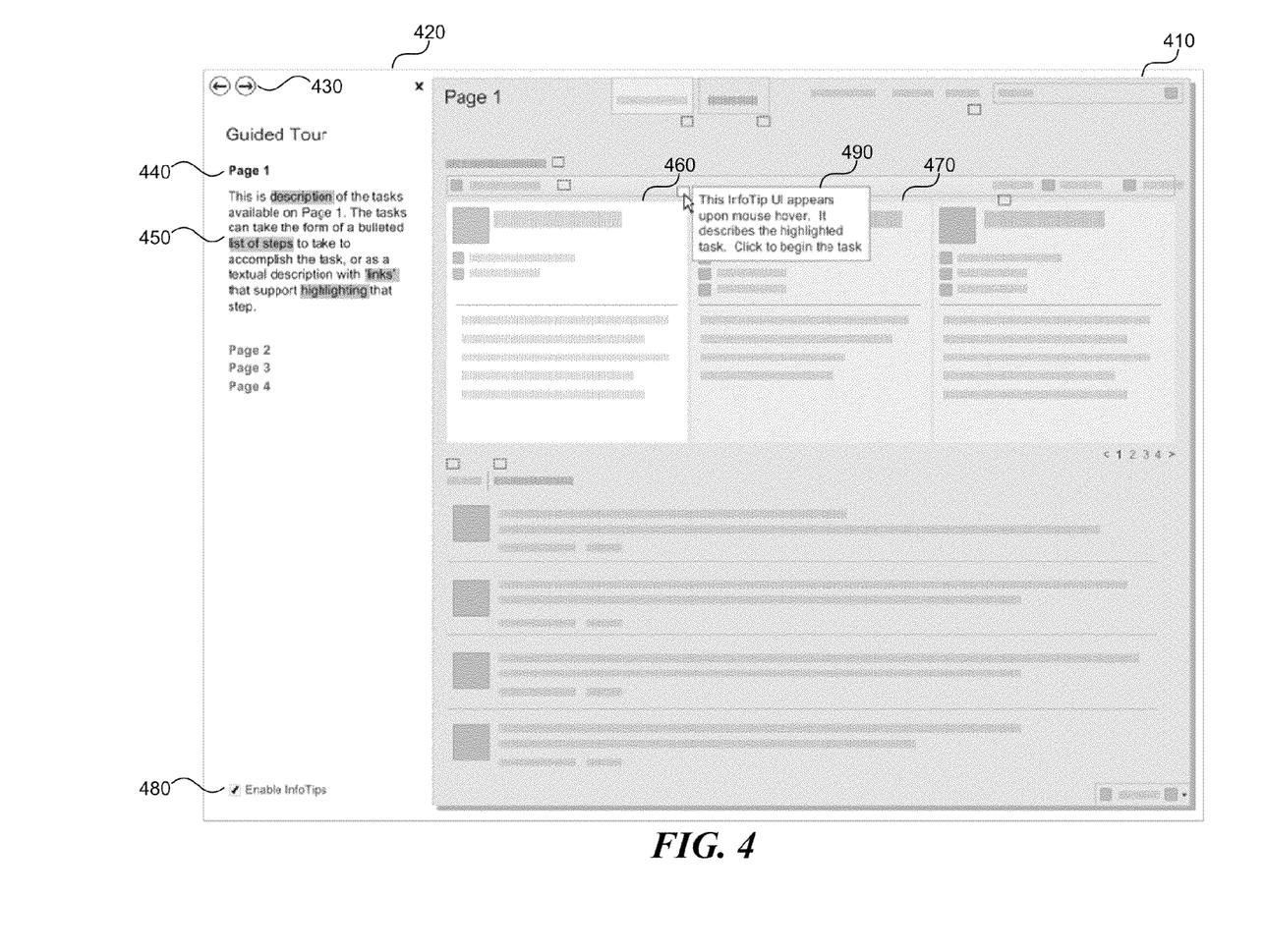
FIG. 4 is a display diagram that illustrates a window displaying an application page and elements of the application assistance system, in one embodiment.

FIG. 4 is a display diagram that illustrates a window displaying an application page and elements of the application assistance system, in one embodiment. The window includes an application page 410 that provides a user interface for a user to perform one or more tasks. Adjacent to the application page 420, the user has activated a task pane 420 that displays task pane mode help information provided by the system. The task pane includes navigation controls 430, one or more task steps 440, and a task step detail view 450. The navigation controls 430 allow the user to navigate to subsequent and previous steps of the task. The one or more task steps 440 list steps for which the system provides help information. The task step detail view 450 provides detailed instructions to assist the user in performing the current step of the task. The instructions may include embedded data that matches that already entered by the user on the application page 410 to provide the user with contextually relevant guidance to complete the task. The task pane 420 may also include an in-page mode control 480 for enabling the display of help information associated with elements of the application page 410. For example, the pop-up box 490 illustrates help information displayed when the user hovers over a particular region of the application page 410. The application page 410 also includes a highlighted region 460 and one or more faded regions 470 that illustrate the highlighting of the system described herein. The highlighting draws the user's attention to the highlighted region 460.

In some embodiments, the application assistance system advances the display of task pane mode or in-page mode help information automatically. For example, the system may initially display help information for a first step of a task, and then as the user completes that step the task pane and/or in-page help information may change to display help information about a next step. The system may also display animated transitions or other visual elements to guide the user further through the progression of steps that accompanies many tasks. The system may also provide non-sequential help information. For example, as the user hovers over or selects various elements of a displayed application page, the system may update the task pane and/or in-page help information to display contextually relevant help information for the active portion of the user interface.

In some embodiments, the application assistance system allows a web site owner to separate site design from help documentation. For example, the system may provide a platform through which a site designer adheres to well defined rules, such as placing a DIV or other separator around relevant elements and providing each element with a name distinguishable from that of other elements. Later or separately, a help documentation designer can provide documentation relevant to each named element and the system will cause appropriate help information to be displayed when the user is interacting with appropriate elements of the user interface as described further herein. This frees both the site designer and the documentation designer from distractions that come with having to coordinate with each other.

In some embodiments, the application assistance system automates one or more steps in addition to providing help information. For example, the help information may describe some action that the user can take to complete a task, and the system may offer a "show me" button that the user can activate to have the system perform the suggested action. If the help steps describe navigating to a configuration page and changing a configuration setting, then the show me button might cause the system to navigate to the configuration page and highlight the setting for the user to change the setting to the desired value.

In some embodiments, the application assistance system allows site designers to provide hints about where to display in-page mode help information. For example, when the site designer associates a help icon with a particular element of an application page, the site designer may set an attribute of the help icon to indicate whether a pop-up help window should be displayed above, below, to the left, or to the right of the help icon. This hint allows the site designer to control where help information is displayed and to select a location that will not obscure relevant areas of the user interface that the user will access to complete the task.

Database, XML

In some embodiments, the application assistance system stores help information in a database or XML file associated with a web page. For example, the system may provide a downloadable XML file with hierarchically defined help information and associated page elements so that a client browser can display help information as the user interacts with different areas of a web page. This may also allow the user to receive help information for a cached page when the user is offline, such as viewing a web page from a laptop while on an airplane.

From the foregoing, it will be appreciated that specific embodiments of the application assistance system have been described herein for purposes of illustration, but that various modifications may be made without deviating from the spirit and scope of the invention. For example, although web applications have been described as examples herein, the system can also use similar techniques to provide assistance in other types of applications, such as desktop and mobile applications. Accordingly, the invention is not limited except as by the appended claims.

We claim:

1. A computer-implemented method for providing application assistance information in a task pane, the method comprising:

receiving a request to display in a task pane application assistance information related to a task that a user can perform through an application page, wherein the task comprises a plurality of steps, the request received after the user has performed at least one of the plurality of steps in the task, and wherein the user has not received assistance information related to the task for a prior step in the plurality of steps in the task;

determining a user progress context that indicates a user's current progress in the plurality of steps in performing the task, by monitoring the user's interaction with the task and wherein determining further comprises identifying data related to the task that the user has entered into the application page;

retrieving from a help information data store help information applicable to the determined user progress context;

displaying the task pane near the application page, wherein the task pane includes at least part of the retrieved help information related to the determined user progress context and at least a portion of the data that the user has entered into the application; and highlighting one or more regions of the application page related to the determined user progress context and retrieved help information to increase user focus on the regions, wherein the preceding steps are performed by at least one processor.

2. The method of claim 1 wherein receiving a request comprises receiving an indication that a user selected a help link from a web page to activate the assistance.

3. The method of claim 1 wherein determining a user progress context comprises identifying one or more of the plurality of steps of the task that the user has already completed;

wherein retrieving help information comprises displaying help information about a next step of the task for which the user has already completed one or more prior steps as indicated by the user progress context without displaying to the user help information related to the already completed steps of the plurality of steps of the task which were completed prior to the user requesting the assistance information.

4. The method of claim 1 wherein retrieving help information comprises displaying help information about a next step of the task for which the user has already completed one or more prior steps as indicated by the user progress context.

5. The method of claim 1 wherein retrieving help information comprises integrating data already entered by the user in an appropriate place within help text so that the user receives contextually relevant assistance information with the user's own data.

6. The method of claim 1 wherein retrieving help information comprises downloading a data file associated with a web site that includes the application page.

7. The method of claim 1 wherein displaying the task pane comprises resizing the application page so that the task pane and application page can fit within an existing application window.

8. The method of claim 1 wherein highlighting one or more regions comprises fading one or more other regions not related to the current task.

9. The method of claim 1 wherein highlighting one or more regions comprises identifying an HTML DIV tag related to one or more regions and adjusting one or more display settings associated with the identified tag.

10. The method of claim 1 further comprising determining an updated user progress context based on one or more actions received from the user in response to the displayed help information and updating the task pane to display help information related to the updated user progress context.

11. A computer system for providing application assistance, the system comprising:

a processor and memory configured to execute software instructions;

a help request component configured to detect a first user request to activate application assistance to receive help performing one or more tasks related to a software application, the first user request received after the user has completed at least a portion of the one or more tasks;

a help information store configured to store assistance information for display to the user during application assistance;

a user progress context component configured to detect user progress within an identified application task, the task having a plurality of steps, determine user data provided by the user at one of the plurality of steps prior to the user requesting the application assistance, wherein the user data is data that originates outside the software application, and provide context information to other components of the system, the context information including the determined user data;

a task pane mode component configured to provide application assistance to the user through a task pane user interface displayed outside of an application page for which the user has requested assistance;

an in-page mode component configured to provide application assistance to the user through assistance information displayed within the application page for which the user has requested assistance; and a page highlighting component configured to focus user attention on one or more regions of an application page to help direct the user to a next step location of a task by displaying at least a portion of the context information.

12. The system of claim 11 wherein the help request component is further configured to receive an indication that a user selected a control to display a help task pane, and in response display the help task pane.

13. The system of claim 11 wherein the user progress context component is further configured to provide an indication of a current task step that the user is performing for the system to provide assistance at that step within the identified task.

14. The system of claim 11 wherein the user progress context component is further configured to receive updates to the user's progress as the user takes additional actions within an application page and to provide the updated context information to other components of the system.

15. The system of claim 11 wherein the page highlighting component is further configured to receive updated information on the user's progress through the task from the user progress context component and update the region or regions that are highlighted to draw the user's attention to a subsequent step of the task.

16. The system of claim 11 wherein the user progress component determines that the user is in a middle of the application task at a time the user first requests application assistance, wherein the user has not been provided with application assistance for previously executed steps in the one or more tasks.

17. The method of claim 1 wherein data related to the task that the user has entered into the application page comprises typed information typed by the user.

18. The method of claim 1 wherein data related to the task that the user has entered into the application page comprises an attachment provided by the user.

* * * * *